3,130,242
SEPARATION OF ISOBUTENE FROM GASES
Rolf Platz, Mannheim, Hugo Kroeper, Heidelberg, and Karl Schloemer, Ludwigshafen (Rhine), Germany, assignors to Badische Anilin- & Soda-Fabrik Aktiengesellschaft, Ludwigshafen (Rhine), Germany
Filed June 5, 1961, Ser. No. 114,686
1 Claim. (Cl. 260—677)

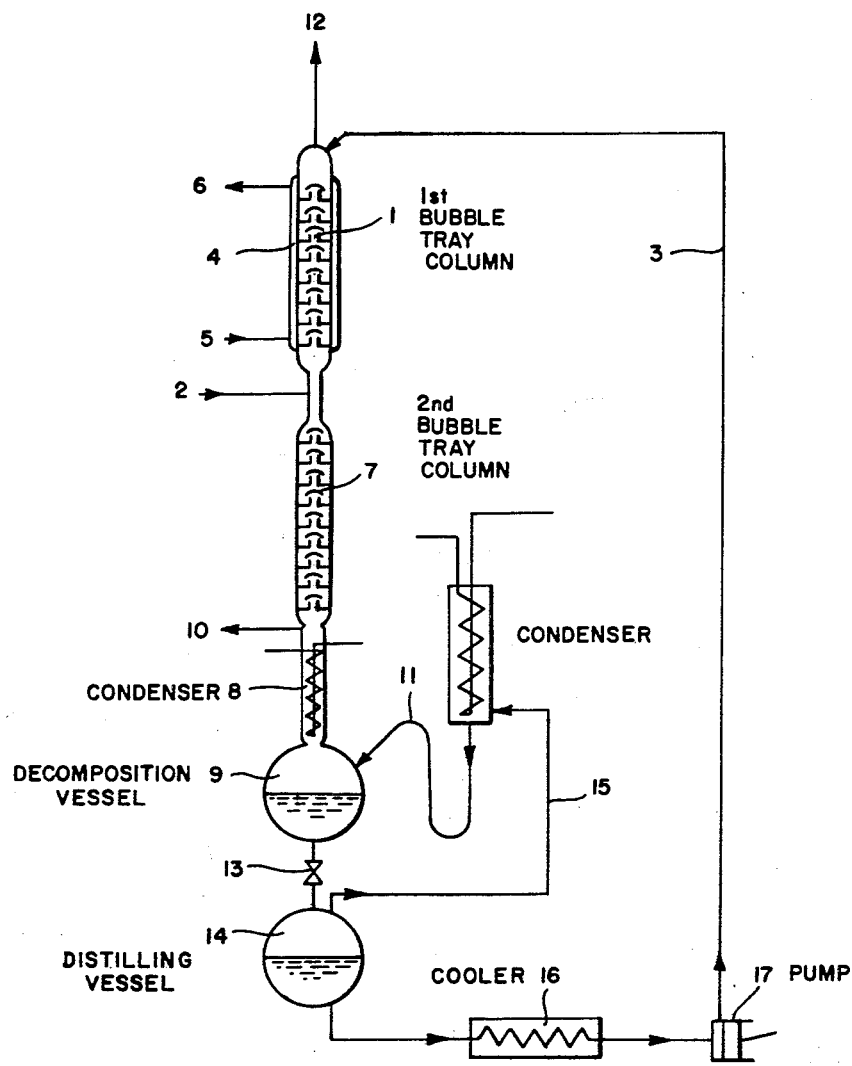

This invention relates to a process for the separation of pure isobutene from gases which contain isobutene in admixture with other lower saturated and unsaturated hydrocarbons. More particularly, the invention relates to the separation of pure isobutene from mixtures of isomeric butenes, which may contain butane and butadiene.

For the polymerization of isobutene to high polymers, such as polyisobutene or butyl rubber, very pure isobutene is required. Isobutene can only be separated from other olefines, especially from the isomeric butenes, with considerable technical difficulty.

It is known to separate isobutene as tertiary butyl alcohol from the other butenes which react more slowly or not at all with dilute sulfuric acid, by selective hydration with a mixture of dilute sulfuric acid and tertiary butanol. This process has the disadvantage that the conversion of isobutene is too low, the space-time yield being about 0.28 kilogram of tertiary butanol per liter of dilute sulfuric acid per day. A further disadvantage of the process resides in the fact that after distillation the tertiary butanol must be converted to isobutene in a separate stage by splitting off water.

We have now found that isobutene can be separated in a simple way and in pure form from gases by leading the gas into an absorption solution of a lower carboxylic acid and a strongly acid catalyst and decomposing the tertiary butyl ester thermally to pure isobutene with the addition of water.

The advantage of the process according to this invention is a considerable improvement in the space-time yield. On an average, space-time yields of 1.6 kilograms of isobutene per liter of carboxylic acid per day are obtained, i.e., the catalytic esterification with carboxylic acids proceeds 5.7 times more quickly than the reaction with dilute sulfuric acid.

The process is suitable for the separation of pure isobutene from gases containing hydrocarbons, for example gases which occur in petroleum processing, especially in the cracking of gas oil to gasoline or in the cracking of petroleum or petroleum fractions for the production of lower olefines by the various methods at present in use. These gases contain $C_4$-hydrocarbons, i.e., normal- and iso-butane, isomeric butenes and butadiene, in addition to other saturated and unsaturated hydrocarbons, such as methane, ethane, ethylene, propane, propylene and higher hydrocarbons with 5 or more carbon atoms which can readily be separated by a simple distillation. The process is especially suitable for the difficult separation of pure isobutene from a mixture of $C_4$-hydrocarbons.

Solutions of strongly acid catalysts, for example boron trifluoride, and of inorganic acids, e.g., perchloric acid and sulfuric acid in lower aliphatic carboxylic acids, for example in aliphatic carboxylic acids with 1 to 4 carbon atoms, such as formic acid, acetic acid, propionic acid and butyric acid, are suitable as absorption solutions.

In general, 0.1 to 10% by weight solutions of the said catalysts in the acids specified are used; we prefer to use 0.1 to 5% solutions of the catalyst in acetic or propionic acid. The amount of catalyst depends on the water content of the carboxylic acid. It is advantageous to use the carboxylic acids as solvents in anhydrous form. Carboxylic acids which contain very small amounts of water, for example up to about 5% by weight, may however also be used as solvents. A small water content of the carboxylic acid used can be compensated for by adding a larger amount of catalyst while observing the limits specified above.

The process is in general carried out at normal temperature, for example at 0° to 40° C., especially at room temperature or the ambient temperature and at normal pressure. These temperatures hold good for the process of absorption. The desorption is carried out at a moderately elevated temperature, for example at 80° to 140° C., especially at 90° to 120° C.

In carrying out the process, the gas mixture to be separated is introduced into the absorption solution. Introduction is advantageously continued as long as the rate of absorption of the isobutene in the absorption solution remains constant. In general the absorption rate falls as soon as about 75% of the carboxylic acid has reacted with isobutene. It is advantageous to remove the gases physically dissolved in the liquid by applying a vacuum. The physically dissolved gases may however also be separated from the absorption solution by leading the absorption solution countercurrent to a pure isobutene. This procedure is to be preferred for continuous operation.

To inhibit the polymerizing action of the catalyst, water is added to the mixture. It is advantageous to add about 0.3 to 30% by weight, advantageously 5 to 15% by weight of water to the absorption solution. The tertiary butyl ester in the mixture to which water has been added can be thermally decomposed by heating the mixture to the boiling point. It is advantageous to boil the mixture at the boiling point under reflux. A pure isobutene is thus directly obtained if the carboxylic acids entrained according to their vapor pressure are separated for example by a water wash and the isobutene is dried for example over active aluminum oxide.

The apparatus for carrying out the process may be made from any of the various materials known in the art and conventional for the purpose. For the cold parts of the apparatus there may be used for example a plastic, such as polyvinyl chloride, while those parts of the apparatus which are exposed to high temperatures may be made for example from glass, ceramic material, enamel or graphite bonded with synthetic resin. When using metallic apparatus, it is preferable to use titanium as the material if perchloric acid is used as catalyst. If sulfuric acid is used as catalyst, it is advisable to make the apparatus of lead.

The invention is illustrated by, but not limited to, the following examples.

*Example 1*

277 liters (642 grams) of an isobutene-containing mixture with an isobutene content of 35% by weight is led in the course of 2½ hours into a solution of 25 grams of boron trifluoride in 1000 grams of propionic acid. The unabsorbed part of the gas is collected in a cooled trap as the first fraction. This first fraction weighs 182 grams and, like the other fractions, has its composition given in the following Table. The solution absorbs 460 grams of isobutene-containing gas mixture, from which by degassing under reduced pressure by means of a water jet pump and by cooling, 240 grams can be separated as the second fraction. Then 100 grams of water is added to the solution, two layers being formed from which the chemically combined isobutene is expelled by heating. Three fractions (fractions 3, 4, and 5) are obtained in amounts of 92, 45 and 51 grams, the percentage composition of which is to be seen in the following table.

| Fraction | $C_2H_6$ | $C_2H_4$ | $C_3H_8$ | $C_3H_6$ | $n-C_4H_{10}$ | $i-C_4H_{10}$ | $cis-C_4H_8$ | $trans-C_4H_8$ | $C_4H_8-1$ | $i-C_4H_8$ |
|---|---|---|---|---|---|---|---|---|---|---|
| 1 | 0.13 | 0.3 | 1.0 | 1.0 | 0.4 | 2.17 | 10 | 21 | 48 | 16 |
| 2 |  |  |  |  |  |  | 2 | 1 | 3 | 94 |
| 3 |  |  |  |  |  |  |  |  |  | 100 |
| 4 |  |  |  |  |  |  |  |  |  | 100 |
| 5 |  |  |  |  |  |  |  |  |  | 100 |

*Example 2*

70 liters (177 grams) of an isobutene-containing mixture with an isobutene content of 35% by weight is introduced in the course of 6 hours into a solution of 2 grams of 70% perchloric acid ($HClO_4$) in 200 grams of acetic acid. 89 grams of gas is not absorbed. Then 20 grams of water is added to the mixture, no separation into two phases taking place. By boiling under reflux, three gas fractions (1, 2 and 3) of 15 grams, 50 grams and 23 grams are obtained in liquid form by condensation at −80° C.

The percentage compositions of these fractions may be seen from the following table:

| Fraction | $C_3H_8$ | $C_3H_6$ | $C_4H_{10}$ | $i-C_4H_{10}$ | $C_4H_8-1$ | $cis-C_4H_8-2$ | $trans-C_4H_8-2$ | $i-C_4H_8$ |
|---|---|---|---|---|---|---|---|---|
| 1 | 0.2 | 0.7 | 0.4 | 2.0 | 45.7 | 8 | 18 | 25.0 |
| 2 |  | 0.2 |  | 0.7 | 19 | 8 | 14 | 58.1 |
| 3 |  |  |  |  |  |  |  | 100.0 |

*Example 3*

This example is given with reference to the accompanying drawing.

A mixture which contains 45% by volume of isobutene, 35% by volume of normal butene and 10% by volume of normal- and iso-butane is supplied through a pipe 2 at the rate of 20 liters per hour to the bottom of a glass bubble tray column 1 having 20 bubble trays, in countercurrent to an absorption solution flowing into the column through a pipe 3. To carry off the heat of reaction column 1 is surrounded by a cooling jacket 4, the cooling water entering through a pipe 5 and leaving through a pipe 6. The feed to the top of the column 1 through the pipe 3 is 150 milliliters per hour of a mixture of 6% by weight of sulfuric acid in propionic acid with up to 1.5% by weight of water. The absorption solution laden with the gases flows through a second bubble tray column 7 with 20 bubble trays and through a reflux condenser 8 into a decomposition vessel 9 heated at 110° C. By adding 15 milliliters per hour of water to the decomposition vessel 9 through a pipe 11, the tertiary butyl ester is decomposed into isobutene and propionic acid. On the cold side of the reflux condenser 8, 9 liters per hour of 99.9% isobutene are withdrawn through a pipe 10. After stationary operation has been established, isobutene also flows upward from the decomposition vessel 9 through the reflux condenser 8 into the bubble tray column 7 acting as a countercurrent condenser and therein strips off the physically dissolved butylene isomers and butanes. The expelled gases pass through the bubble tray column 1 and leave through a pipe 12 at the rate of 11 liters per hour; this is a lean gas with a content of less than 0.1% by volume of isobutene. The hot aqueous absorption solution flows from the decomposition vessel 9 through a valve 13 to a distilling vessel 14 from which the water is distilled off azeotropically with propionic acid through a vapor line 15. This azeotrope serves as the water addition to the decomposition vessel 9. The absorption solution leaving the distilled vessel 14 at 140° C. is cooled to 20° C. in a cooler 16 and returned by a pump 17 to the top of the bubble tray column 1.

We claim:

A process for the separation of isobutene from gases containing isobutene which comprises leading the gases into an absorption solution comprising a lower carboxylic acid and 0.1% to 10% by weight with reference to the carboxylic acid of a strongly acid catalyst selected from the group consisting of boron trifluoride, perchloric acid and sulfuric acid as long as the rate of absorption of the isobutene in the absorption solution remains constant at temperatures of from 0° C. to 40° C. and thermally decomposing the tertiary butylester formed to pure isobutene by heating the mixture after addition of 0.3 to 30% of water to temperatures of from 80 to 140° C.

References Cited in the file of this patent

UNITED STATES PATENTS

| | | |
|---|---|---|
| 2,041,193 | Lee | May 19, 1936 |
| 2,079,652 | Davis et al. | May 11, 1937 |
| 2,741,632 | Cottle | Apr. 10, 1956 |
| 3,005,856 | Gislon et al. | Oct. 24, 1961 |
| 3,026,362 | McKeever | Mar. 20, 1962 |